3,091,626
METHOD OF MAKING FERROUS CITRATE
Gustav H. Carlson, Detroit, Mich., assignor to R. P. Scherer Corporation, Detroit, Mich., a corporation of Michigan
No Drawing. Filed June 20, 1960, Ser. No. 37,039
9 Claims. (Cl. 260—439)

This invention relates to a method for preparing ferrous citrate. This compound finds use in anti-anemia preparations and as a food supplement. Generally, ferrous salts for food and medicinal purposes are unstable and difficult to manufacture. Tablets and capsules which are commercially available are confined primarily to the sulfate, the gluconate and the newer fumarate.

Although ferrous citrate has been known for many years it has not been commercially available, probably because of the difficulty encountered in its preparation. Kammerer in 1873 reported [Annalen der Chemie, 93, 185 (1873)], that he prepared the salt by boiling iron wire in a citric acid solution. Obviously, this method is impractical and not suitable for commercial operation. Ferrous citrate cannot be prepared in accordance with the well known methods for preparation of salts. If, for example, citric acid and a ferrous salt are mixed in the correct stoichiometric proportions for producing ferrous citrate the yield will be entirely unsatisfactory, if ferrous citrate is obtained at all.

I have found that ferrous citrate can be produced efficiently by reacting a ferrous salt with citric acid if the reaction conditions are controlled so that the pH of the solution is maintained between 2 and about 4 or 5. If the pH of the solution is below 2, any ferrous citrate which is formed will redissolve and cannot be recovered from the solution. If the pH is raised to about 5 or 6, hydrolysis of the ferrous salt begins which reduces the yield in proportion to the increase in pH. It is absolutely necessary to control the pH within the stated limits to effect precipitation of the ferrous citrate in worthwhile quantities as it is formed. I have found that the salt precipitates sharply at the boiling point of the solution of reactants.

For example, the pH which is normally low because of the presence of citric acid can be brought into the desired range by adding ammonium hydroxide; or the proportion of the reactants may be adjusted to maintain the pH within the desired critical range. The preferred pH of the solution will vary somewhat with the particular reactants employed but is in the range of 2.5 to 3.

The preferred salts for purposes of the reaction are ferrous sulfate, ferrous acetate, ferrous ammonium sulfate and ferrous propionate. Other ferrous salts are suitable but less desirable because they are difficult to prepare in pure form and/or to handle in production processes because they oxidize readily to the ferric state, e.g. ferrous chloride.

In a preferred form of the invention anhydrous citric acid is reacted with ferrous sulfate heptahydrate in the presence of an aqueous solution of ammonium hydroxide. Suitable proportions by weight are:

|  | Percent |
|---|---|
| Citric acid | About 46 |
| Ferrous sulfate heptahydrate | About 43 |
| Ammonium hydroxide | About 11 |

The reaction is carried out in aqueous solution, the amount of water added being sufficient to produce an approximately 60% solution of the three reactants. The pH of the solution is 2.8. The solution is boiled for about one hour under reflux conditions, during which time a white precipitate of ferrous citrate is formed having an empirical formula $C_6H_8O_8Fe$. The precise structural formula for the compound has not been determined. The precipitated salt requires no further treatment after washing and is obtained in good yield.

The following specific examples will illustrate various procedures that may be employed in carrying out the method of the invention.

Example I

Ammonium hydroxide (6 grams of 58% solution) was added to 15 grams of citric acid (anhydrous) and 13.9 grams of ferrous sulfate heptahydrate in 50 cc. of water, the solution (pH range 2.5–3.0; preferred 2.6) was boiled under a reflux condenser for about an hour, cooled to room temperature, and the precipitated white salt was filtered off, washed thoroughly with water and finally with methanol.

The salt (7.5 grams, dried in vacuo at 70° C.) gave the following value upon analysis:

Analysis.—Calculated $C_6H_8O_8Fe$: Fe, 21.2%. Found: Fe, 21.3%.

On concentrating the filtrate and combined washes to about 40 cc. and boiling the solution under a reflux condenser for about one-half hour an additional yield of salt (1.5 grams) was obtained and on repetition of the process another 0.5 gram of salt was recovered, though somewhat impure as indicated by analytical results.

Example II

Anhydrous citric acid (7 grams) was added to 9.8 grams of sodium citrate dihydrate and 13.9 grams of ferrous sulfate heptahydrate in 110 cc. of water at 60° C., the solution (pH range 2.7–3.2; preferred 2.9) was concentrated by boiling to about 85 cc., cooled to room temperature, the precipitated white salt was filtered off, washed thoroughly with water and methanol and dried in vacuo at 70° C. Yield 4.5 grams.

Analysis.—Calculated $C_6H_8O_8Fe$: Fe, 21.2%. Found: Fe, 21.3%.

On concentrating the combined filtrates to about 85 cc. and repeating the above procedure an additional yield of 3.5 grams of pure ferrous salt was obtained and 0.5 gram of impure salt was recovered by repeating the procedure.

Example III

A solution of 25.5 grams of barium acetate in 50 cc. of water at 60° C. was added to 27.8 grams of ferrousسulfate heptahydrate dissolved in 50 cc. of water at 60° C., the mixture was boiled 5 minutes and, after one hour, the precipitated sulfate was filtered off and washed with a little water. Anhydrous citric acid (22.1 grams) was dissolved in the combined filtrates (pH range 2.7–3.2; preferred 2.9) the solution was concentrated by boiling to 160 cc., cooled to room temperature and the precipitated ferrous salt treated as before. Yield 19.4 grams.

Analysis.—Calculated $C_6H_8O_8Fe$: Fe, 21.2%. Found: Fe, 21.3%.

The combined filtrates, concentrated to 40 cc. and treated as previously described, yielded 1.6 grams of pure ferrous salts and on repetition of the process 1.1 grams of impure product was recovered.

Example IV

To a solution of 15 grams of citric acid (anhydrous) and 19.6 grams of ferrous ammonium sulfate hexahydrate in 50 cc. water at 50–60° C. was added 6 grams of ammonium hydroxide (58%), the solution (pH range 2.5–3.0) was boiled under a reflux condenser for one hour and cooled to room temperature. The precipitated, white ferrous salt was filtered off and washed thoroughly with water and finally methanol. Yield 3.65 grams of ferrous citrate.

The combined filtrate and washes were concentrated to about 40–45 cc., the mixture was boiled one-half hour, cooled to room temperature and the isolated salt, treated as before, yielded 4.1 grams of ferrous citrate. On repetition of the process, 0.2 gram of the salt, somewhat impure, was recovered.

*Example V*

Ammonium hydroxide (135 parts, 58% solution) was added to 337.5 parts of citric acid (anhydrous) and 312 parts of ferrous sulfate heptahydrate in 1125 parts of water, the solution (pH 2.8) was filtered, boiled under a reflux condenser for about one hour, cooled to room temperature and the precipitated white salt was collected in a centrifuge, washed thoroughly with water and finally with methanol.

The salt (155.5 parts, dried in vacuo at 55° C.) gave the following value upon analysis:

*Analysis.*—Calculated $C_6H_8O_8Fe$: Fe, 21.2%. Found: Fe, 21.2%.

On concentrating the filtrate and the initial aqueous wash to about 60 gallons and boiling the solution under a reflux condenser for about one hour an additional yield of salt (55.5 parts) was obtained on processing the mixture as previously described.

From three successive similar preparations the composite yield amounted to 570 parts of ferrous citrate as obtained from 360 parts of ammonium hydroxide, 900 parts of citric acid (anhydrous), 832 parts of ferrous sulfate heptahydrate and 3000 parts of water by proceeding as described in the prior paragraphs. In addition, salt (9 parts) of somewhat inferior quality was obtained by processing the combined filtrates as previously described.

What I claim as new and desire to secure by Letters Patent of the United States is:

1. A method for preparing ferrous citrate having the empirical formula $C_6H_8O_8Fe$ which comprises mixing citric acid with an aqueous solution of a ferrous salt taken from the group consisting of ferrous sulfate, ferrous acetate, ferrous ammonium sulfate, and ferrous propionate, heating the mixture for a sufficient time to form and precipitate ferrous citrate while maintaining the pH of the mixture between 2 and 4 and separating the precipitate from the solution.

2. A method for preparing ferrous citrate having the empirical formula $C_6H_8O_8Fe$ which comprises mixing citric acid with an aqueous solution of a ferrous salt taken from the group consisting of ferrous sulfate, ferrous acetate, ferrous ammonium sulfate, and ferrous propionate, boiling the solution under reflux conditions for a sufficient time to form and precipitate ferrous citrate while maintaining the pH between 2 and 4 and separating the precipitate from the solution.

3. A method for preparing ferrous citrate having the empirical formula $C_6H_8O_8Fe$ which comprises adding anhydrous citric acid to a solution of ferrous sulfate heptahydrate and ammonium hydroxide, the proportions of said ingredients being adjusted to bring the pH of the solution to from 2.5 to 3.0, boiling the solution under reflux conditions for a sufficient time to form and precipitate ferrous citrate and filtering the ferrous citrate precipitate from the solution.

4. A method for preparing ferrous citrate having the empirical formula $C_6H_8O_8Fe$ which comprises adding anhydrous citric acid to a solution of ferrous sulfate heptahydrate and ammonium hydroxide, the proportions of said ingredients being adjusted to bring the pH of the solution to about 2.8, filtering the solution, boiling the filtrate under reflux conditions for a sufficient time to form and precipitate ferrous citrate and filtering the ferrous citrate precipitate from the solution.

5. A method for preparing ferrous citrate having the empirical formula $C_6H_8O_8Fe$ which comprises mixing anhydrous citric acid with a solution of ferrous acetate, the relative proportions being such as to bring the pH of the mixture to about 2.9, heating the solution to form and precipitate ferrous citrate and filtering the precipitate.

6. A method for preparing ferrous citrate having the empirical formula $C_6H_8O_8Fe$ which comprises boiling a solution of barium acetate and ferrous sulfate heptahydrate to form a precipitate, cooling the mixture, filtering the mixture to recover the filtrate containing soluble ferrous acetate, dissolving sufficient anhydrous citric acid in the filtrate to bring the pH of the solution within the range of 2.7 to 3.2, heating the solution to precipitate ferrous citrate and separating the precipitated ferrous citrate from the solution.

7. A method for preparing ferrous citrate having the empirical formula $C_6H_8O_8Fe$ which comprises adding anhydrous citric acid to a solution of trisodium citrate dihydrate and ferrous sulfate heptahydrate, the proportions of the ingredients being adjusted to bring the pH in the solution to about 2.9, heating the solution for a sufficient length of time to form and precipitate ferrous citrate and filtering the precipitate from the solution.

8. A method for preparing ferrous citrate having the empirical formula $C_6H_8O_8Fe$ which comprises adding anhydrous citric acid to a solution of ferrous ammonium sulfate hexahydrate and ammonium hydroxide, the proportions of these reactants being adjusted to bring the pH to 2.5 to 3.0, boiling the solution under reflux conditions to form and precipitate ferrous citrate and filtering the precipitate from the solution.

9. A method for preparing ferrous citrate having the empirical formula $C_6H_8O_8Fe$ which comprises preparing a 60% aqueous solution of the following composition:

| | Percent |
|---|---|
| Ammonium hydroxide | About 11 |
| Citric acid | About 46 |
| Ferrous sulfate heptahydrate | About 43 | said solution having a pH of about 2.8, filtering the solution, boiling the filtrate under reflux conditions to form and precipitate ferrous citrate, cooling the filtrate and precipitate to room temperature and separating the ferrous citrate precipitate from the solution.

References Cited in the file of this patent

UNITED STATES PATENTS

| 2,081,547 | Matthews | May 25, 1937 |
| 2,904,573 | Oroshnik | Sept. 15, 1959 |

FOREIGN PATENTS

| 702,179 | Great Britain | Jan. 13, 1945 |

OTHER REFERENCES

Franke: Chemical Abstracts, vol. 26, p. 964 (1932).